United States Patent [19]

Karubian

[11] 4,439,889

[45] Apr. 3, 1984

[54] STUNNING GUN

[76] Inventor: Ralph Karubian, 7100 S. Avalon Blvd., Los Angeles, Calif. 90003

[21] Appl. No.: 399,489

[22] Filed: Jul. 19, 1982

[51] Int. Cl.³ .............................................. A22B 3/02
[52] U.S. Cl. .................................................... 17/1 B
[58] Field of Search ................................ 17/1 B, 1 R

[56] References Cited

U.S. PATENT DOCUMENTS 910,775  1/1909  Bergh ..................................... 17/1 B
4,219,905  9/1980  Thacker et al. ...................... 17/1 B Primary Examiner—Willie G. Abercrombie
Attorney, Agent, or Firm—Bruce L. Birchard

[57] ABSTRACT

By increasing the mass and reducing the surface friction of the piston driving a penetrating bolt in an animal stunning gun and providing that bolt with a conically-shaped recess at its tip, maximum penetrating force with minimum gun complexity is achieved. Further simplification of the gun without the sacrifice of any performance is achieved by utilizing magnetic retention means for the bolt prior to the firing of the gun.

10 Claims, 1 Drawing Figure

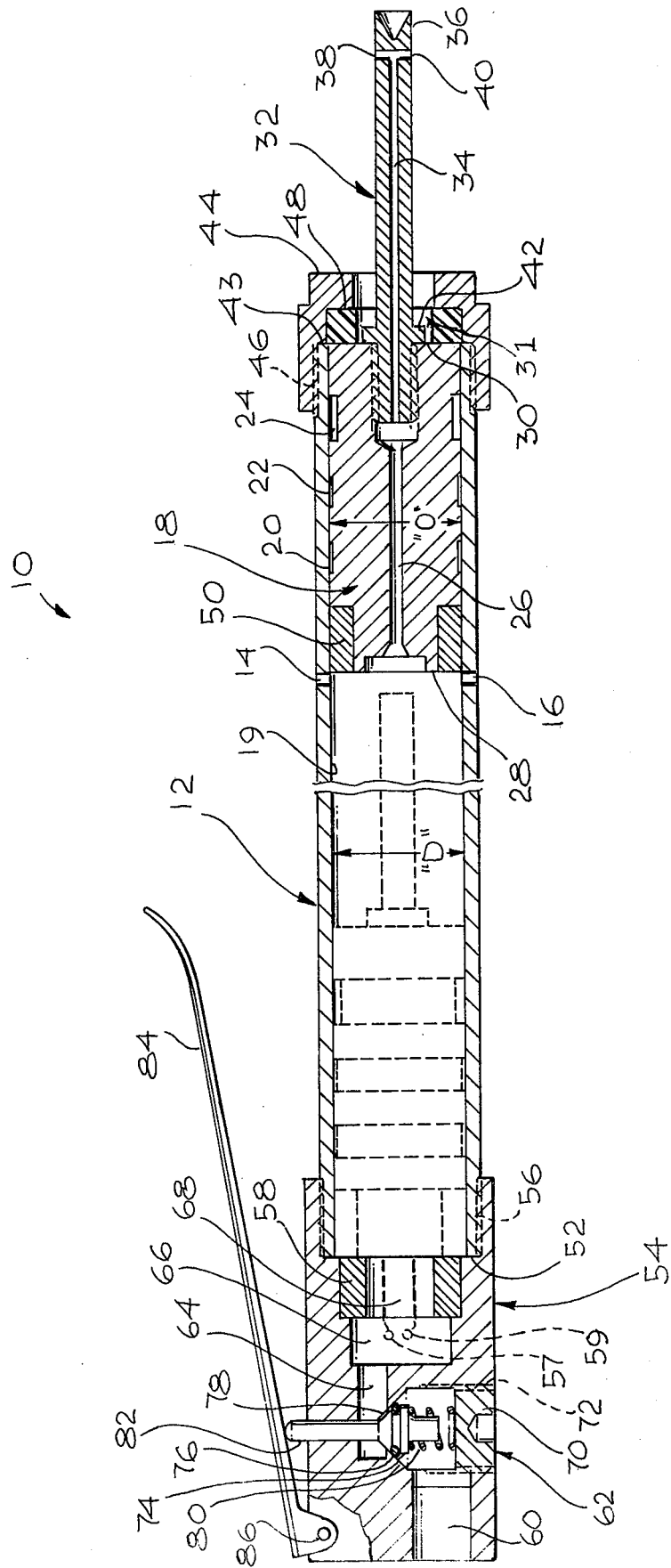

STUNNING GUN

BACKGROUND OF THE INVENTION

1. Field of the Invention

This invention relates to animal-stunning tools for use in slaughter houses.

2. Prior Art

Slaughter house techniques have varied over the ages from the crudeness of a sledge-hammer to the sophistication of electrical-shock equipment. The object of all this equipment is to cause unconciousness in the animal during slaughter but not causing the cessation of the pumping action of the heart. The flow of blood through the animal is important to the quality of the meat obtained from the animal.

A search of the Patent Office records has revealed U.S. Pat. No. 4,219,905 (Thacker) which is related to but not anticipative of my invention. In the Thacker patent a piston of low mass and carrying a low-mass needle is moved forward by a blast of compressed air released through a complex combination of valves. Because of the low mass of the piston and needle, the penetrating power of the combination is limited. The combination of valves incorporated in Thacker is expensive, complex, and subject to malfunctioning. Further, the O-rings and seals in Thacker's device cause friction during operation of the piston and are also subject to wear and failure under the air pressure which must be used.

Therefore, it is the general object of this invention to provide an animal stunning gun which is free from the problems associated with prior art devices.

It is further object of this invention to provide a low-cost, highly effective stunning gun with minimal operational problems.

SUMMARY OF THE INVENTION

By providing a relatively massive cylindrical piston with annular recesses in its outer surface, such piston having a diameter such that it forms a slip fit with its containing cylinder so as to eliminate O-rings with their friction, the penetrating bolt carried by said piston having a conically-concave tip, retention of said piston and bolt in the retracted state being by magnetic means, a compressed-air stunning gun with maximum simplicity and effectiveness is realized.

BRIEF DESCRIPTION OF THE DRAWINGS

Those and other features of my invention will be understood from the description which follows taken in connection with the accompanying drawings in which:

The sole FIGURE is a cross-sectional view of an animal stunning gun according to this invention.

DETAILED DESCRIPTION OF THE PREFERRED EMBODIMENT

In the sole FIGURE, stunning gun 10 includes cylindrical, hollow barrel 12 having opposed apertures 14 and 16 therein and having an inside-diameter "D". A cylindrical piston 18, of stainless steel, conventional steel or other material, having an outer-diameter "O" such that a slip-fit exists between piston 18 and the inner wall 19 of diameter "D" in barrel 12, is designed to move within barrel 12 without releasing air around its outer extremity. Piston 18 has annular recesses 20, 22 and 24 which reduce surface friction between inner wall 19 and piston 18 without significantly reducing the mass of piston 18. A coaxial air passage 26 extends from end 28 of piston 18 to opposite end 30 thereof. The air passage 26 is enlarged at end 30 and internally threaded to permit insertion and retention of bolt or probe 32 therein. Probe 32 has an air passage 34 coaxially therethrough aligned with air passage 26 in piston 18 except that air passage 34 bi-furcates near end 36 of probe 32 into two exhaust ports 38 and 40 having a direction substantially 90° from the axis of passage 34. Annular stop 42 is provided on probe 32 to firmly seat probe 32 in piston 18. Piston 18 and probe 32 may be made of stainless steel to minimize corrosion and contamination. Probe 32, which must be very hard and cannot be made of stainless steel, terminates at its exposed end 36 in a concavity of conical shape. This concentrates penetrating forces in a sharp edge on end 36, enhancing the penetrating powers of probe 32. Air in front of piston 18 as it moves probe 32 into the animal's skull is exhausted through port 31.

Barrel 12 is closed at one end 43 by cap 44 which may be held onto barrel 12 by internal threads 46. A rubber or other shock-absorbing cushion 48, or a coil spring, is held in cap 44. A ring of magnetic material or a ceramic magnet, itself, 50 is secured in piston 18 near end 28.

The opposite end 52 of barrel 12 carries handle 54 by means of threads 56, for example.

Handle 54 contains therein retaining ring magnet 58 polarized to attract and cooperate with ring 50, assuming ring 50 is a magnet. Handle 54 further contains compressed air inlet aperture 60 which selectively communicates through valve assembly 62 with intermediate chamber 64, outlet chamber 66 and the central opening 68 in ring magnet 58 to permit the controlled flow of air therethrough to end 28 of piston 18. Valve assembly 62 includes plug 70 which is secured in handle 54 by means of a threaded region 72. Spool 74 carrying "O"-ring 76 is held captive by plug 70, on one extremity and by shoulder 78 in handle 54 on the opposite extremity. "O"-ring 76 presses against shoulders 78 and forms an air-tight seal therewith under urging from spring 80. Actuating arm 82 on spool 74 extends beyond the surface of handle 54 to permit its actuation by trigger 84 which is pivotally supported at pivot 86 in handle 54.

Upon depression of trigger 84 with piston 18 in a retracted position, compressed air introduced at inlet aperture 60 passes through valve assembly 62, intermediate chamber 64 and outlet chamber 66 and through opening 68 in ring magnet 58 to impress itself on end 28 of piston 18. When the retaining force between magnet 58 and magnetic material or ring magnet 50 is overcome, piston 18, with its considerable mass, is accelerated by the compressed air and attains considerable momentum. Probe 32 moves forward and, with cap 44 resting on or adjacent to an animal's head, probe 32 penetrates the skull and enters the brain. When probe 32 has completed its travel, piston 18 is beyond apertures 14 and 16 and the compressed air escapes through those apertures, terminating the forward thrust on piston 18 and probe 32. A small portion of the compressed air is injected into the brain cavity and the brain of the animal through exhaust ports 38 and 40, causing the animal to become unconscious or comatose. The probe 32 is removed from the animal's skull by pulling back on handle 62. The rebound action produced by the coil or cushion 48 assists the removal of the probe 32 from the skull. The gun is then re-cocked by holding it with probe 32 upright, causing probe 32 to retract into a position with magnetic material 50 in contact with ring magnet 58. The side ports 38 and 40 are relatively free of debris as compared with an end-ported device.

It should be noted that magnet 58 may be an electromagnet, as is indicated by leads 57, 59 in the sole FIGURE. The flux field of magnet 58 is made such that ring 50 and piston 18 are retained in the retracted position until the pressure on piston 18 becomes high so that piston 18 is released in impulse fashion and achieves its operating speed rapidly. Further, the length of barrel 12 is made longer than the combined lengths of piston 18 and the exposed portion of probe 32 so that the combination of piston and probe will achieve a significant forward momentum before probe or bolt 32 strikes the skull of the animal being stunned.

Thus, it can be seen that there has been provided a stunning gun which is simple in construction, subject to little failure in operation and effective in its performance.

While a particular embodiment has been shown and described, it will be apparent to one skilled in the art that variations and modifications thereof may be made without departing from the spirit and scope of my invention. It is the purpose of the appended claims to cover all such variations and modifications.

I claim:

1. A stunning gun having:
    a barrel with an inner wall having a first inside diameter and with first and second ends;
    a piston having a first maximum outside diameter supported coaxially within said barrel for movement therein;
    said first maximum outside diameter having a magnitude such that said piston forms a slip fit with said first inside diameter of said inner wall of said barrel;
    a probe fixedly and coaxially supported at the end of said piston corresponding to said second end of said barrel and moveable with said piston;
    said piston and said probe each having inter-communicating air passages therethrough;
    said air passage in said probe having a coaxial portion and a communicating exhaust portion at right angles thereto;
    said piston having annular recesses in the outer surface thereof and carrying on its end corresponding to said first end of said barrel a region of magnetic material;
    a handle portion carried by said barrel at said first end thereof and having an air inlet aperture and intermediate and outlet chambers therein,
    said intermediate chamber and said outlet chamber being intercoupled for air passage therethrough;
    said outlet chamber being coupled, for air passage, to said barrel;
    a valve assembly carried in said handle and interposed between said air inlet aperture and said intermediate chamber for control of air flow between said inlet aperture and said intermediate chamber and, consequently, for control of air into said barrel;
    a magnet carried within said handle adjacent said first end of said barrel for magnetically attracting and releasably retaining said magnetic material and the piston in which it is carried in a position adjacent said first end of said barrel prior to the firing of said gun;
    said inlet aperture being adapted for coupling to a source of compressed air; and,
    a trigger carried by said handle and positioned to engage and actuate said valve assembly for permitting the passage of compressed air from said inlet aperture to said piston to cause motion of said piston and the probe carried thereby.

2. Apparatus according to claim 1 in which said magnetic material carried by said piston is ceramic magnet polarized to cooperate with and be attracted to said magnet in said handle.

3. Apparatus according to claim 1 including, in addition, stop means positioned adjacent said second end of said barrel for limiting the travel of said piston.

4. Apparatus according to claim 3 in which said stop means includes a rubber ring.

5. Apparatus according to claim 3 in which said stop means is secured to said barrel by cooperating threads on said barrel and on said stop means.

6. Apparatus according to claim 1 in which said probe has first and second ends, said second end being remote from said piston and having a conically-shaped recess therein.

7. Apparatus according to claim 1 in which said barrel has at least one aperture therethrough transverse to the axis of said barrel and spaced from said second end of said barrel by a distance substantially equal to the length of said piston.

8. Apparatus according to claim 1 in which said magnet is a ferrite-ceramic permanent magnet.

9. Apparatus according to claim 1 in which said magnet is an electro-magnet.

10. Apparatus according to claim 1 in which the length of said barrel exceeds the combined lengths of said piston and said probe, with said probe in place in said piston.

* * * * *